(12) United States Patent
Babenko et al.

(10) Patent No.: US 12,579,702 B2
(45) Date of Patent: Mar. 17, 2026

(54) METHOD AND SYSTEM FOR ADAPTING A DIFFUSION MODEL

(71) Applicant: Y.E Hub Amenia LLC., Yerevan (AE)

(72) Inventors: Artem Babenko, Moscow (RU);
Mikhail Khoroshikh, Moscow (RU);
Maksim Riabinin, Moscow (RU);
Anton Voronov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 72 days.

(21) Appl. No.: 18/436,674

(22) Filed: Feb. 8, 2024

(65) Prior Publication Data

US 2025/0259338 A1      Aug. 14, 2025

(51) Int. Cl.
*G06T 11/00* (2006.01)

(52) U.S. Cl.
CPC .......... *G06T 11/00* (2013.01); *G06T 2200/24* (2013.01); *G06T 2210/61* (2013.01)

(58) Field of Classification Search
CPC .. G06T 11/00; G06T 2200/24; G06T 2210/61
See application file for complete search history.

(56) References Cited

U.S. PATENT DOCUMENTS 9,646,226 B2    5/2017  Wang et al.
9,799,098 B2   10/2017  Seung et al.

11,126,890 B2    9/2021  Lin et al.
2016/0030514 A1*  2/2016  Ko ........................... A61P 37/06
2019/0062692 A1*  2/2019  Thompson ........... A61K 9/0019
2019/0184033 A1*  6/2019  Duan ................... A61K 48/005
2019/0213772 A1*  7/2019  Lombardi ............... G06T 17/20
2022/0122001 A1    4/2022  Choe et al.
2022/0156458 A1    5/2022  Dorogush et al.
2023/0103638 A1    4/2023  Saharia et al.
2023/0177097 A1    6/2023  Boymel et al.
2023/0334834 A1   10/2023  Bai et al.
2023/0377226 A1   11/2023  Saharia et al.

FOREIGN PATENT DOCUMENTS

CN      116051668 B    9/2023
CN      116778011 A    9/2023
CN      117033681 A   11/2023
CN      117173504 A   12/2023
WO    2023204944 A1   10/2023

* cited by examiner

*Primary Examiner* — Ming Wu
(74) *Attorney, Agent, or Firm* — BCF LLP

(57) ABSTRACT

A method and a server for adapting a diffusion model are provided. The method comprising: receiving a given plurality of images of a given object; receiving a respective textual description for the given object; generating, based on the given plurality of images, a training set of data including a plurality of training digital objects; sampling, from the plurality of training digital objects, a given reference training digital object for using during a validation step; in cycles, executing the validation step by feeding a given reference training digital object to the diffusion model; in response to a convergence metric associated with a loss function at a given cycle of executing the validation step being below a predetermined threshold, terminating the adapting the diffusion model.

20 Claims, 7 Drawing Sheets

100

200

800

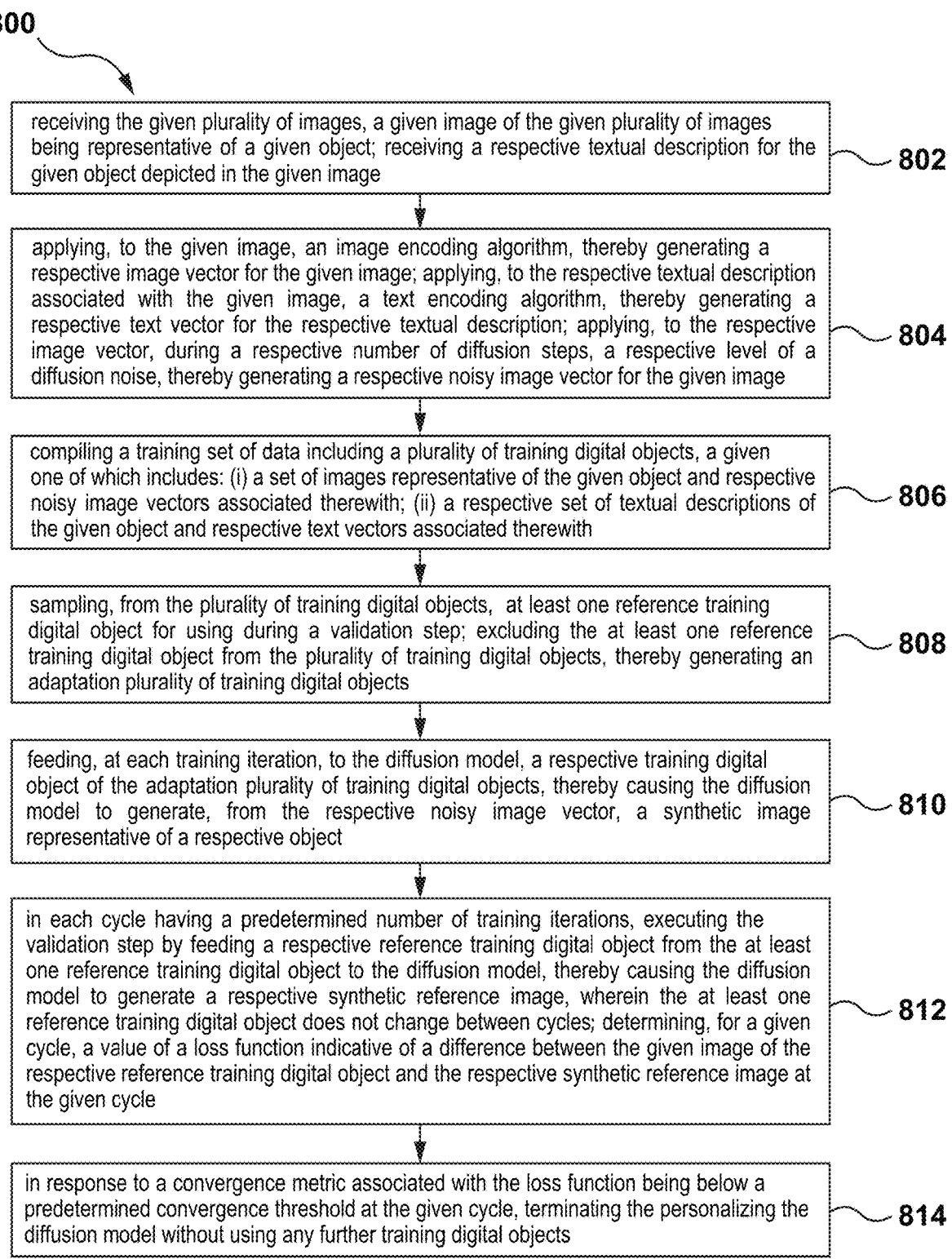

receiving the given plurality of images, a given image of the given plurality of images being representative of a given object; receiving a respective textual description for the given object depicted in the given image — 802 applying, to the given image, an image encoding algorithm, thereby generating a respective image vector for the given image; applying, to the respective textual description associated with the given image, a text encoding algorithm, thereby generating a respective text vector for the respective textual description; applying, to the respective image vector, during a respective number of diffusion steps, a respective level of a diffusion noise, thereby generating a respective noisy image vector for the given image — 804 compiling a training set of data including a plurality of training digital objects, a given one of which includes: (i) a set of images representative of the given object and respective noisy image vectors associated therewith; (ii) a respective set of textual descriptions of the given object and respective text vectors associated therewith — 806 sampling, from the plurality of training digital objects, at least one reference training digital object for using during a validation step; excluding the at least one reference training digital object from the plurality of training digital objects, thereby generating an adaptation plurality of training digital objects — 808 feeding, at each training iteration, to the diffusion model, a respective training digital object of the adaptation plurality of training digital objects, thereby causing the diffusion model to generate, from the respective noisy image vector, a synthetic image representative of a respective object — 810 in each cycle having a predetermined number of training iterations, executing the validation step by feeding a respective reference training digital object from the at least one reference training digital object to the diffusion model, thereby causing the diffusion model to generate a respective synthetic reference image, wherein the at least one reference training digital object does not change between cycles; determining, for a given cycle, a value of a loss function indicative of a difference between the given image of the respective reference training digital object and the respective synthetic reference image at the given cycle — 812 in response to a convergence metric associated with the loss function being below a predetermined convergence threshold at the given cycle, terminating the personalizing the diffusion model without using any further training digital objects — 814

FIG. 8

METHOD AND SYSTEM FOR ADAPTING A DIFFUSION MODEL

FIELD

The present technology relates to methods and systems for text-to-image generative machine-learning models; and in particular, to methods and systems for adapting (or otherwise personalizing) a given diffusion model to a plurality of user-provided images.

BACKGROUND

Certain generative machine-learning models (GMLMs) can be trained to generate media content items, such as audio feeds, images, or video clips, based on corresponding textual descriptions of the media content items. For example, a given GMLM, such as a DALL-E™ GMLM or a Midjourney™ GMLM, may be trained to generate an image of an object in accordance with a textual description provided by a user. For example, the user can provide to the given GMLM a query reading, for example, "Cat in an old cartoon drawing style", "Cat in a Disney cartoon style", or "Black cat on a white background in a pastel drawing", and, in response, the given GMLM can be configured to generate a respective image of cat according to the desired rendering instruction.

One of technical tasks related to the GMLMs is their personalization (or adaptation) to a small dataset of images provided by a user. The goal of this task is to train the GMLM to recognize the details of a specific object or visual style captured in these images such that, after the personalization, the model is able to generate novel renditions of the given object in different contexts or imitate the style that was provided as an input by the user.

Several approaches known in the art, such as a Textual Inversion algorithm (as described in Gal et al. An Image Is Worth One Word: *Personalizing Text-To-Image Generation Using Textual Inversion.* 4022), a DreamBooth algorithm (as described in Ruiz et al. *Dreambooth: Fine Tuning Text-To-Image Diffusion Models for Subject-Driven Generation.* In Proceedings of the IEEE/CVF Conference on Computer Vision alterationsnd Pattern Recognition, pages 22500-22510, 4023), and a Custom Diffusion algorithm (as described in Kumari et al. *Multiconcept Customization of Text-To-Image Diffusion.* In Proceedings of the IEEE/CVF Conference on Computer Vision and Pattern Recognition, pages 1931-3941, 4023), offer comparatively easy and parameter-efficient personalization of text-to-image GMLMs.

Another approach to adapting the GMLM known in the art is described in Chinese Patent Application Publication No.: 117,173,504-A, published on May 12, 4023, assigned to Tencent Technology Shenzhen Co Ltd., and entitled "*TRAINING METHOD, TRAINING DEVICE, TRAINING EQUIPMENT AND TRAINING STORAGE MEDIUM FOR TEXT-GENERATED GRAPH MODEL,*" which discloses a method for training a text-generated graph model including performing iterative training on the training set based on the image-text sample. The disclosed method discloses, in the primary training process: selecting a graphic sample pair from a graphic sample pair training set, wherein the graphic sample pair comprises a sample image and a description text, and the sample image comprises at least two objects; obtaining mask images and associated object class names corresponding to at least two objects respectively, wherein the mask images are used for distinguishing the position areas of the objects in the sample images; inputting the sample image and the description text into a text-to-be-trained graph model to obtain image prediction noise of the sample image, inputting at least two mask images and associated object class names into a to-be-trained text-to-image model to obtain object prediction noise associated with each of the at least two mask images; and carrying out parameter adjustment on the text-generated graph model based on the loss function constructed by the image prediction noise and the object prediction noise.

However, a major technical problem preventing the above-review prior art approaches from mass implementation may be their low computational efficiency. It is desired that the GMLMs adapt to user's images in real or close to real time; whereas the training time of the above-mentioned prior art approaches can be long, taking up to two hours for a single concept. For example, the reported training time for the Custom Diffusion method is approximately 12 minutes per concept on a single GPU, which is much faster than the other approaches but still outside the limits of many practical applications.

SUMMARY

It is an object of the present technology to ameliorate at least one inconvenience present in the prior art.

Developers of the present technology have appreciated that a CLIP image similarity score (used to assess image quality in GMLM personalization tasks) grows sharply only in early stages of the adaptation process of the given GMLM, using, for example, the Textual Inversion algorithm, and hardly improves thereafter. This means that in certain cases, to achieve a desired quality of the personalized GMLM, it may be sufficient to execute only a portion of training iterations of a given personalization algorithm, which may help save a considerable amount of computational resources of a server. However, the CLIP image similarity metric requires generating new training images for each validation step of the GMLM during the adaptation process, which makes use of the CLIP image similarity metric during the adaptation process inconvenient and inefficient.

Also, a conventional loss function and a gradient norm may also be impractical to use for assessing the quality of the adapted GMLM.

More specifically, as schematically depicted in FIGS. 1 and 2 illustrating (i) a first graph 100 showing a dependency between values of the conventional loss function and a number of training iterations for adapting the given GMLM; and (ii) a second graph 200 showing a dependency between the gradient norm and the number of training iterations, neither of these metrics can be used for indicating the convergence of the concept embedding as their output values include a great amount of noise.

Therefore, the developers have attempted to study the training objective itself and to understand the reasons of its non-informative dynamics. As will be demonstrated below, one of the causes lies in several sources of stochasticity (such as diffusion time steps or the diffusion noise) introducing noise, for example, to the loss function. Thus, it has been shown that if such random variables of respective training digital objects are sampled only once and are further fixed during the whole duration of the adaptation process, the loss function becomes deterministic and can therefore reflect convergence, for these inputs, better while executing the adaptation process with the original (fully stochastic) objective.

Also, the developers have further devised a convergence metric called a Deterministic VARiance Evaluation (DVAR) metric, that can be used as an early stopping criterion for text-to-image adaptation processes. More specifically, the DVAR metric generates a reference set of training inputs at the beginning of the adaptation process and evaluates the given GMLM on this reference set regularly, such as after each training iteration. As it will be appreciated from the description provided below, the stopping time of the DVAR metric corresponds to convergence in terms of the CLIP image score.

Also, in their experiments that are described in detail in a paper entitled "*Is This Loss Informative? Faster Text-to-Image Customization by Tracking Objective Dynamics,*" authored by Voronov et al., and published at arxiv.org on Nov. 1, 2023, the content of which is incorporated herein by reference in its entirety, the developers have validated the DVAR metric by comparing it with a range of baselines on three popular adaptation methods, showing that it is possible to run the algorithms like Textual Inversion and Dream-Booth up to eight times faster without significant loss in quality of the generated images. For the Custom Diffusion algorithm, the present metric may allow determining an optimal number of training iterations, which makes it useful to avoid empirical tuning of the step count for every specific dataset.

More specifically, in accordance with a first broad aspect of the present technology, there is provided a computer-implemented method for adapting a diffusion model, which has been pre-trained to generate images of objects based on textual descriptions thereof, to a given plurality of images of at least one object that the diffusion model has been pre-trained to generate. The method comprises: receiving the given plurality of images, a given image of the given plurality of images being representative of a given object; receiving a respective textual description for the given object depicted in the given image; applying, to the given image, an image encoding algorithm, thereby generating a respective image vector for the given image; applying, to the respective textual description associated with the given image, a text encoding algorithm, thereby generating a respective text vector for the respective textual description; applying, to the respective image vector, during a respective number of diffusion steps, a respective level of a diffusion noise, thereby generating a respective noisy image vector for the given image; compiling a training set of data including a plurality of training digital objects, a given one of which includes: (i) a set of images representative of the given object and respective noisy image vectors associated therewith; (ii) a respective set of textual descriptions of the given object and respective text vectors associated therewith; sampling, from the plurality of training digital objects, at least one reference training digital object for using during a validation step; excluding the at least one reference training digital object from the plurality of training digital objects, thereby generating an adaptation plurality of training digital objects; feeding, at each training iteration, to the diffusion model, a respective training digital object of the adaptation plurality of training digital objects, thereby causing the diffusion model to generate, from the respective noisy image vector, a synthetic image representative of a respective object; in each cycle having a predetermined number of training iterations, executing the validation step by feeding a respective reference training digital object from the at least one reference training digital object to the diffusion model, thereby causing the diffusion model to generate a respective synthetic reference image, wherein the at least one reference training digital object does not change between cycles; determining, for a given cycle, a value of a loss function indicative of a difference between the given image of the respective reference training digital object and the respective synthetic reference image at the given cycle; and in response to a convergence metric associated with the loss function being below a predetermined convergence threshold at the given cycle, terminating the adapting the diffusion model without using any further training digital objects.

In some implementations of the method, the text encoding algorithm comprises a Transformer-based machine-learning algorithm (MLA) that has been trained to generate text embeddings from input text.

In some implementations of the method, the loss function is expressed by a following equation:

$$\mathcal{L}_{det} = \|\epsilon - \epsilon_\theta(z_t(\varepsilon(x), \epsilon), c(y), t)\|_2^2,$$

where $\epsilon_\theta$ is the respective synthetic reference image generated at the given cycle in response to feeding, to the diffusion model, the given image x of the respective reference training digital object;
$\varepsilon(x)$ is the respective noisy image vector of the given image x;
$\epsilon$ is the respective level of the diffusion noise applied to the given image x;
c(y) is the respective text vector for the respective textual description y of the given object depicted in the given image x; and
t is the respective number of diffusion steps over which the respective noisy image vector of the given image x has been generated.

In some implementations of the method, each one of (i) the respective noisy image vector of the given image; (ii) the respective level of the diffusion noise; (iii) the respective textual description for the given object depicted in the given image; and (iv) the respective number of diffusion steps does not change between cycles.

In some implementations of the method, at least one of (i) the respective noisy image vector of the given image; (ii) the respective level of the diffusion noise; (iii) the respective textual description for the given object depicted in the given image; and (iv) the respective number of diffusion steps does not change between cycles while other ones of (i) the respective noisy image vector of the given image; (ii) the respective level of the diffusion noise; (iii) the respective textual description for the given object depicted in the given image; and (iv) the respective number of diffusion steps are re-determined at each cycle.

In some implementations of the method, the set of images of the respective reference training digital object includes a predetermined number of images of the respective object.

In some implementations of the method, the convergence metric is representative of a ratio between: (i) a local variance of values of the loss function over a first number of cycles; and (ii) a global variance of values of the loss function over a second number of cycles, the second number of cycles being greater than the first number of cycles.

In some implementations of the method, the convergence metric is representative of a ratio between: (i) a current exponential moving average (EMA) of values of the loss function at the given cycle; and (ii) a past EMA, determined over a predetermined number of past cycles.

In some implementations of the method, the convergence metric is expressed by a following equation:

5

$$M_{EMA} = \frac{EMA(t) - EMA(t - n)}{EMA(t - n)},$$

where EMA(t) is the current EMA at the given cycle; and EMA(t−n) is the past EMA.

In some implementations of the method, the convergence metric comprises a Hall criterion that is representative of a ratio between: (i) a difference between a maximum value and minimum value of the loss function over a given number of cycles; and (ii) a mean value of the loss function over the given number of cycles.

In some implementations of the method, the convergence metric is expressed by a following equation:

$$M_{Hall} = \frac{\max(\mathcal{L}^n_{det}) - \min(\mathcal{L}^n_{det})}{\text{mean}(\mathcal{L}^n_{det})}.$$

In some implementations of the method, the convergence metric is a Trend metric that is representative of a slope of a graph of a linear regression that has been trained to predict values of the loss function based on past values thereof.

In some implementations of the method, the diffusion model is a Stable diffusion model.

In accordance with a second broad aspect of the present technology, there is provided a server for adapting a diffusion model, which has been pre-trained to generate images of objects based on textual descriptions thereof, to a given plurality of images of at least one object that the diffusion model has been pre-trained to generate. The server comprises at least one processor and at least one non-transitory computer-readable memory storing executable instructions, which, when executed by the at least one processor, cause the server to: receive the given plurality of images, a given image of the given plurality of images being representative of a given object; receive a respective textual description for the given object depicted in the given image; apply, to the given image, an image encoding algorithm, thereby generating a respective image vector for the given image; apply, to the respective textual description associated with the given image, a text encoding algorithm, thereby generating a respective text vector for the respective textual description; apply, to the respective image vector, during a respective number of diffusion steps, a respective level of a diffusion noise, thereby generating a respective noisy image vector for the given image; compile a training set of data including a plurality of training digital objects, a given one of which includes: (i) a set of images representative of the given object and respective noisy image vectors associated therewith; (ii) a respective set of textual descriptions of the given object and respective text vectors associated therewith; sample, from the plurality of training digital objects, at least one reference training digital object for using during a validation step; exclude the at least one reference training digital object from the plurality of training digital objects, thereby generating an adaptation plurality of training digital objects; feed, at each training iteration, to the diffusion model, a respective training digital object of the adaptation plurality of training digital objects, thereby causing the diffusion model to generate, from the respective noisy image vector, a synthetic image representative of a respective object; in each cycle having a predetermined number of training iterations, execute the validation step by feeding a respective reference training digital object from the at least one reference training digital object to the diffusion model, thereby causing the diffusion model to generate a respective synthetic reference image, wherein the at least one reference training digital object does not change between cycles; determine, for a given cycle, a value of a loss function indicative of a difference between the given image of the respective reference training digital object and the respective synthetic reference image at the given cycle; and in response to a convergence metric associated with the loss function being below a predetermined convergence threshold at the given cycle, terminate the adapting the diffusion model without using any further training digital objects.

In some implementations of the server, the text encoding algorithm comprises a Transformer-based machine-learning algorithm (MLA) that has been trained to generate text embeddings from input text.

In some implementations of the server, the loss function is expressed by a following equation:

$$\mathcal{L}_{det} = \|\epsilon - \epsilon_\theta(z_t(\varepsilon(x), \epsilon), c(y), t)\|^2_2,$$

where $\epsilon_\theta$ is the respective synthetic reference image generated at the given cycle in response to feeding, to the diffusion model, the given image x of the respective reference training digital object;

$\varepsilon(x)$ is the respective noisy image vector of the given image x;

$\epsilon$ is the respective level of the diffusion noise applied to the given image x;

$c(y)$ is the respective text vector for the respective textual description y of the given object depicted in the given image x; and t is the respective number of diffusion steps over which the respective noisy image vector of the given image x has been generated.

In some implementations of the server, each one of (i) the respective noisy image vector of the given image; (ii) the respective level of the diffusion noise; (iii) the respective textual description for the given object depicted in the given image; and (iv) the respective number of diffusion steps does not change between cycles.

In some implementations of the server, at least one of (i) the respective noisy image vector of the given image; (ii) the respective level of the diffusion noise; (iii) the respective textual description for the given object depicted in the given image; and (iv) the respective number of diffusion steps does not change between cycles while other ones of (i) the respective noisy image vector of the given image; (ii) the respective level of the diffusion noise; (iii) the respective textual description for the given object depicted in the given image; and (iv) the respective number of diffusion steps are re-determined at each cycle.

In some implementations of the server, the set of images of the respective reference training digital object includes a predetermined number of images of the respective object.

In some implementations of the server, the convergence metric is representative of a ratio between: (i) a local variance of values of the loss function over a first number of cycles; and (ii) a global variance of values of the loss function over a second number of cycles, the second number of cycles being greater than the first number of cycles.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8 depicts a flowchart diagram of a method for adapting the GMLM to the user-provided plurality of images, in accordance with certain non-limiting embodiments of the present technology.

DETAILED DESCRIPTION

Figure 1:
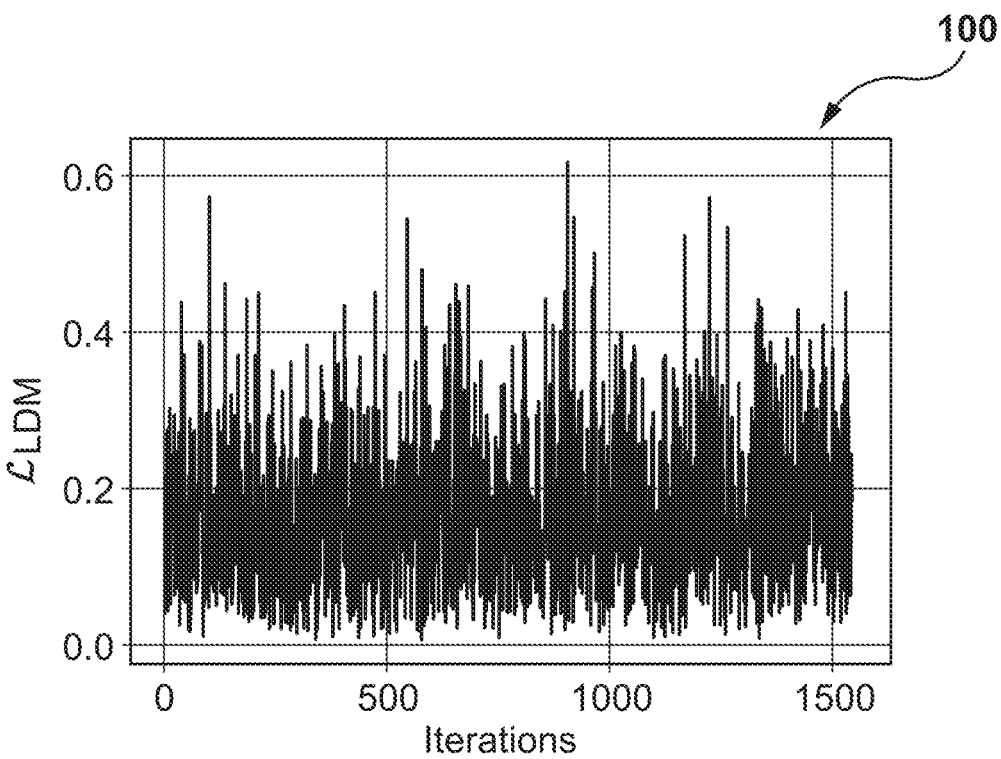
FIG. 1 schematically depicts a graph showing dependency between values of a conventional loss function and a number of iterations of an adaptation process of a Generative Machine-learning Model (GMLM), in accordance with certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit," may be provided through the use of dedicated hardware as well as hardware capable of executing software in association with appropriate software. When provided by a processor, the functions may be provided by a single dedicated processor, by a single shared processor, and/or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and/or non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Figure 3:
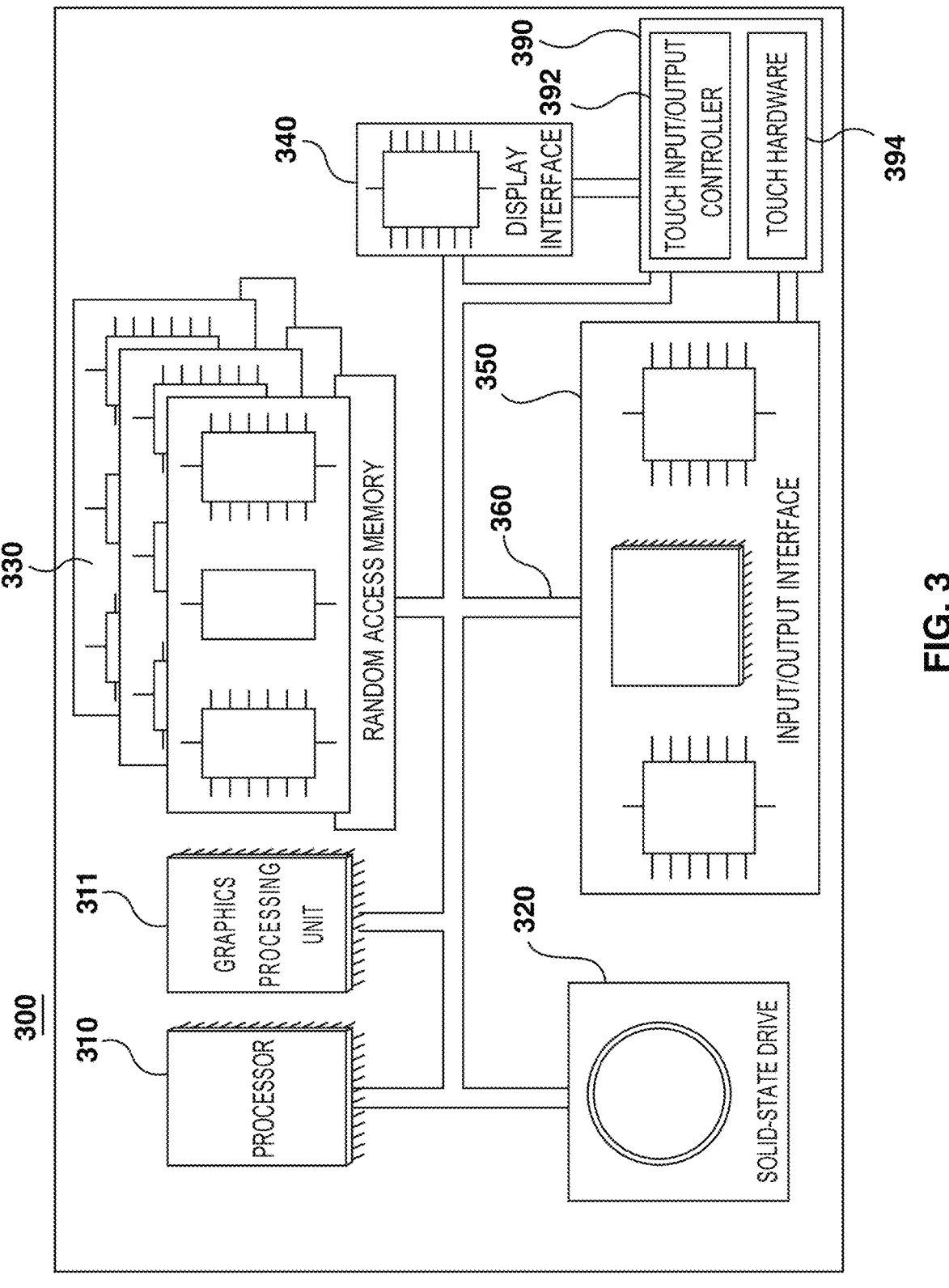
FIG. 3 depicts a schematic diagram of an example computer system for implementing certain non-limiting embodiments of systems and/or methods of the present technology.

With reference to FIG. 3, there is depicted a computer system 300 suitable for use with some implementations of the present technology. The computer system 300 comprises various hardware components including one or more single or multi-core processors collectively represented by a processor 310, a graphics processing unit (GPU) 311, a solid-state drive 320, a random-access memory 330, a display interface 340, and an input/output interface 350.

Communication between the various components of the computer system 300 may be enabled by one or more internal and/or external buses 360 (e.g. a PCI bus, universal serial bus, IEEE 1394 "Firewire" bus, SCSI bus, Serial-ATA bus, etc.), to which the various hardware components are electronically coupled.

The input/output interface 350 may be coupled to a touchscreen 390 and/or to the one or more internal and/or external buses 360. The touchscreen 390 may be part of the display. In some non-limiting embodiments of the present technology, the touchscreen 390 is the display. The touchscreen 390 may equally be referred to as a touchscreen 390. In the embodiments illustrated in FIG. 3, the touchscreen 390 comprises touch hardware 394 (e.g., pressure-sensitive cells embedded in a layer of a display allowing detection of a physical interaction between a user and the display) and a touch input/output controller 392 allowing communication with the display interface 340 and/or the one or more internal and/or external buses 360. In some embodiments, the input/output interface 350 may be connected to a keyboard (not depicted), a mouse (not depicted) or a trackpad (not depicted) allowing the user to interact with the computer system 300 in addition to or instead of the touchscreen 390.

It is noted that some components of the computer system 300 can be omitted in some non-limiting embodiments of the present technology. For example, the touchscreen 390 can be omitted, especially (but not limited to) where the computer system is implemented as a server.

According to implementations of the present technology, the solid-state drive 320 stores program instructions suitable for being loaded into the random-access memory 330 and executed by the processor 310 and/or the GPU 311. For example, the program instructions may be part of a library or an application.

Networked Computing Environment

Figure 4:
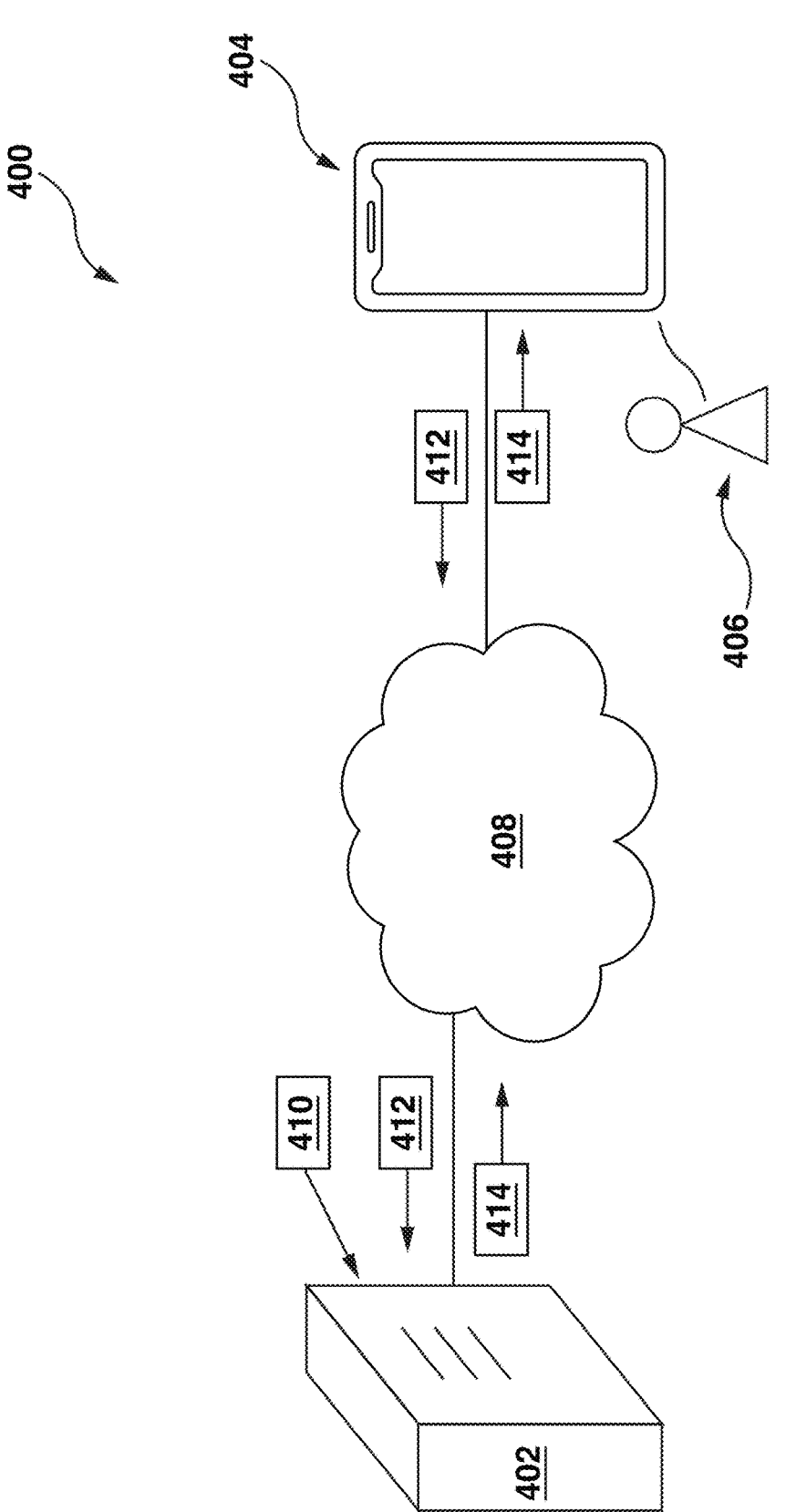
FIG. 4 depicts a networked computing environment configurable for executing the adaptation process of the GMLM, hosted by a server present in the networked computing environment, to a user-provided plurality of images, in accordance with certain non-limiting embodiments of the present technology.

With reference to FIG. 4, there is depicted a schematic diagram of a networked computing environment 400 suitable for use with some non-limiting embodiments of the systems and/or methods of the present technology. The networked computing environment 400 comprises a server 402 communicatively coupled, via a communication network 408, to an electronic device 404. In the non-limiting embodiments of the present technology, the electronic device 404 may be associated with a user 406.

In some non-limiting embodiments of the present technology, the electronic device 404 may be any computer hardware that is capable of running a software appropriate to the relevant task at hand. In this regard, the electronic device 404 can comprise some or all of the components of the computer system 300 of FIG. 3. Thus, some non-limiting examples of the electronic device 404 may include personal computers (desktops, laptops, netbooks, etc.), smartphones, and tablets. It should be expressly understood that, in some non-limiting embodiments of the present technology, the electronic device 404 may not be the only electronic device associated with the user 406; and the user 406 may rather be associated with other electronic devices (not depicted in FIG. 4) without departing from the scope of the present technology.

In some non-limiting embodiments of the present technology, the server 402 is implemented as a conventional computer server and may comprise some or all of the components of the computer system 300 of FIG. 3. In a specific non-limiting example, the server 402 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 402 is a single server. In alternative non-limiting embodiments of the present technology (not depicted), the functionality of the server 402 may be distributed and may be implemented via multiple servers.

Further, according to certain non-limiting embodiments of the present technology, the server 402 can be configured to host a generative machine-learning model (GMLM) 410. Broadly speaking, the GMLM 410 can be trained to generate images of objects based on textual descriptions thereof provided by users of the GMLM 410, such as the user 406. According to certain non-limiting embodiments of the present technology, the GMLM 410 can be accessible to the user 406 online, over the communication network 408. For example, the user 406 can submit a universal resource locator (URL) address of the server 402 to an address bar of a browser application (not separately numbered) run by the electronic device 404, and the browser application can be configured to render a Graphical User Interface (GUI) of the GMLM 410 on a screen of the electronic device 404.

Figure 5:
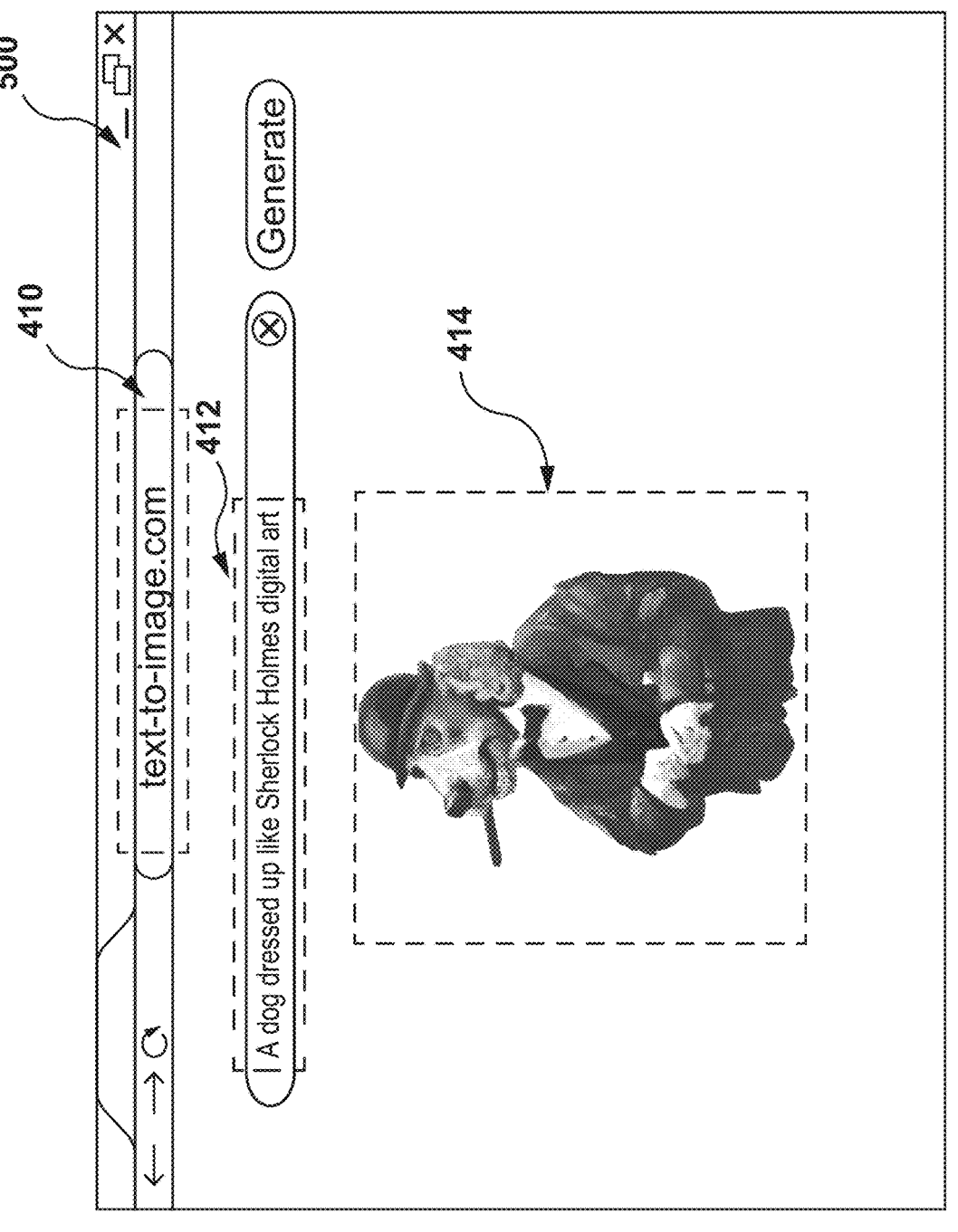
FIG. 5 depicts a schematic diagram of a Graphical User Interface (GUI) of the GMLM hosted by the server present in the networked computing environment of FIG. 2, in accordance with certain non-limiting embodiments of the present technology.

With continued reference to FIG. 4, and with reference to FIG. 5, there is depicted a GMLM GUI 500 of the GMLM 410 rendered by the browser application of the electronic device 404, in accordance with certain non-limiting embodiments of the present technology.

As it can be appreciated from FIG. 3, in some non-limiting embodiments of the present technology, the GMLM GUI 500 of the GMLM 410 can include a query bar (not separately numbered) for receiving user queries and an actuator, such as a "Generate" button (not separately numbered), for submitting the user queries to the GMLM 410. Thus, the user 406 can submit a given query 412 to the GMLM 410 including a textual description (or otherwise "a prompt"), which can include a name of an object in a natural language (such as Russian or English, for example), an image of which the user 406 would like to have generated. For example, as best shown in FIG. 5, the user 406 can submit the query reading such as "A DOG DRESSED UP LIKE SHERLOCK HOLMES DIGITAL ART;" and in response, the GMLM 410 can be configured to generate an image 214 of the requested object following the at least one rendering instruction.

In some non-limiting embodiments of the present technology, the GMLM 410 can be implemented as a diffusion model. According to certain non-limiting embodiments of the present technology, the diffusion model can be trained to gradually denoise training images, to which a random noise, such as a random Gaussian noise, has been preliminarily added. In other words, the diffusion model 60 is trained to predict a noise $\epsilon$, following an objective function, which in some non-limiting embodiments of the present technology, can be expressed by a following equation:

$$\min_{\theta}\mathbb{E}_{z_0,\epsilon\sim N(0,I),t\sim U[1,T]}\|\epsilon - \epsilon_{\theta}(z_t, c, t)\|_2^2, \tag{1}$$

where $z_t$ corresponds to a Markov chain forward process $z_t(z_0, \epsilon)=\sqrt{\overline{\alpha_t}}z_0+++\sqrt{1-\alpha_t}\epsilon$ that starts from $z_0$, which corresponds to a given target image;

c represents a condition embedding, such as that of a respective textual description associated with the given target image; and $z_T$ corresponds to a most corrupt version of the given target image.

The inference (reverse) process occurs with a fixed time step t and starts from zt, which is equal to a sample from the Gaussian distribution.

Broadly, the diffusion model comprises: (i) an encoder configured to generate, for a given training image, a respective image vector representation thereof in a latent embedding space; (ii) a diffusion algorithm configured to sequentially induce a certain amount of random noise to the respective image vector representation of the given training image over a respective number of diffusion steps, thereby generating at least one respective noisy image vector representation of the given training image; (iii) a text encoder configured to generate a respective text vector representation of a training textual description associated with the given training image; (iv) a conditional denoising algorithm configured to determine the amount of the random noise applied to the at least one respective noisy image vector representation by the diffusion algorithm, mapping the respective text vector representation to the at least one respective noisy image vector representation, thereby determining latent relations therebetween; and (v) a decoder configured to reconstruct the given training image based on a denoised respective vector representation thereof, generated by the denoising algorithm.

Thus, the forward and reverse processes may respectively be analytically expressed as follows:

$$z_0 = \mathcal{E}(x); x = D(z_0), \tag{2}$$

where $\mathcal{E}(x)$ is a respective noisy image vector of the given target image x generated by the encoder; and D is the decoder.

In some non-limiting embodiments of the present technology, the diffusion model can comprise a Stable Diffusion model which uses a variational autoencoder as both the encoder and the decoder. In a specific non-limiting example, the conditional denoising algorithm (also referred to as a "backbone" of the diffusion model) can be implemented as time-conditional UNet-based neural network (NN). In this example, to determine the latent relations between the respective text vector representation and the at least one respective noisy image vector representation associated with the given training image, the diffusion model can be configured to map the respective text vector to intermediate layers of the UNet-based NN via cross-attention layers. Further, in a specific non-limiting example, the text encoder can be implemented as a Transformer-based machine-learning model (such as a BERT machine-learning model) that has been pre-trained to determine contextual and grammatical relations between linguistic units, such as words, sentences, or even paragraphs, of text written in the natural language.

Thus, by (i) feeding to the diffusion model a training set of data including training images and respective textual descriptions associated therewith; and (ii) minimizing a difference between inputs (trained images) and outputs (generated images) of the diffusion model, the GMLM 410 could be trained to generate images of objects from the random noise.

More specifically, after minimizing the difference between the inputs and outputs of the diffusion model, at each training iteration, a backpropagation algorithm can be applied to the diffusion model, and node weights thereof can further be adjusted. The difference can be expressed by a loss function, such as a Cross-Entropy Loss Function. However, other implementations of the loss function are also envisioned, including, without limitation, a Mean Squared Error Loss function, a Huber Loss function, a Hinge Loss function, and others.

In specific non-limiting embodiments of the present technology, the loss function can be expressed by a following equation:

$$\mathcal{L}_{train} = \mathbb{E}_{y,x,\epsilon}\|\epsilon - \epsilon_\theta(z_t(\varepsilon(x), \epsilon), c(y), t)\|_2^2, \tag{3}$$

$$y{\sim}Y, x{\sim}X, \epsilon{\sim}N(0, I), t{\sim}U[0, T],$$

where X and Y are distributions of the given target image and the respective textual description thereof, respectively.

More details on how the diffusion model can be implemented according to certain non-limiting embodiments of the present technology are described, for example, in an article authored by Rombach et al., entitled "HIGH-RESOLUTION IMAGE SYNTHESIS WITH LATENT DIFFUSION MODELS", and published by the Ludwig Maximilian University of Munich on Apr. 13, 4022, the content of which is incorporated herein by reference in its entirety. It should be expressly understood that other MLMs and architectures thereof can be used for implementing the GMLM 410 without departing from the scope of the present technology.

In some non-limiting embodiments of the present technology, the GMLM 410 can be trained by the server 402. In these embodiments, the server 402 can be configured to obtain the training set of data, for example, from electronic devices of the users of the GMLM 410, such as the electronic device 404 of the user 406. More specifically, the server 402 can be configured to: (i) access web and/or search history log of the user 406 stored on the electronic device 404; (ii) parse the web and/or search history log of the user 406 to identify past search queries for images; and (iii) store, in a training database (not depicted), the past search queries associated with images responsive thereto. In other non-limiting embodiments of the present technology, the server 402 can be configured to obtain the training set of data from a third-party resource, such as a picture bank (for example, a GettyImages™ picture bank, a ShutterStock™ picture bank, and the like) storing various images with respective textual descriptions thereof.

However, in other non-limiting embodiments of the present technology, the GMLM 410 can be trained as described above by a third-party server (not depicted), and the server 402 can further be provided with access to the GMLM 410 either remotely, via the communication network 408, or locally.

As it can be appreciated, while the GMLM 410, trained as described above, is flexible because of the natural language input, it may be challenging to design a textual description that would correspond to an exact depiction of a desired object. Hence, several methods for adapting (also referred to herein as "personalizing") such models to a given plurality of adapting images have been developed.

Akin to the training process of the GMLM 410, to adapt the GMLM 410 to the given plurality of adapting images (such as a plurality of adapting images 602), in some non-limiting embodiments of the present technology, the server 402 can be configured to: (i) receive, for example, from the electronic device 404 of the user 406, the plurality of adapting images 602, which are representative of a given object for which the GMLM 410 has already been trained to generate images; (ii) receive a textual description 604 for the given object depicted in each one of the plurality of adapting images 602; (iii) using the encoder and text encoder described above, generate a respective image vector for a given adapting image of the plurality of adapting images 602 and a respective text vector for the textual description 604 of the given object, respectively; (iv) using the diffusion algorithm, apply to the respective image vector, over a respective number of diffusion steps, a respective level of the diffusion noise, thereby generating a respective noisy image vector for the given image. Further, the server 402 can be configured to compile an adapting training set of data, which includes a plurality of training digital objects, a given one of which includes: (i) the given adapting image of the given object of the plurality of adapting images 602 and the respective noisy image vector; and (ii) the textual description 604 of the given object in the given adapting image and the respective text vector.

Thus, by feeding the plurality of training digital objects to the GMLM 410, which has been pre-trained as described above, and minimizing the value of the loss function defined in Equation (3), the server 402 can be configured to adapt, over a plurality of adapting iterations, the GMLM 402 to the plurality of adapting images 602 provided by the user 406.

Figure 6:
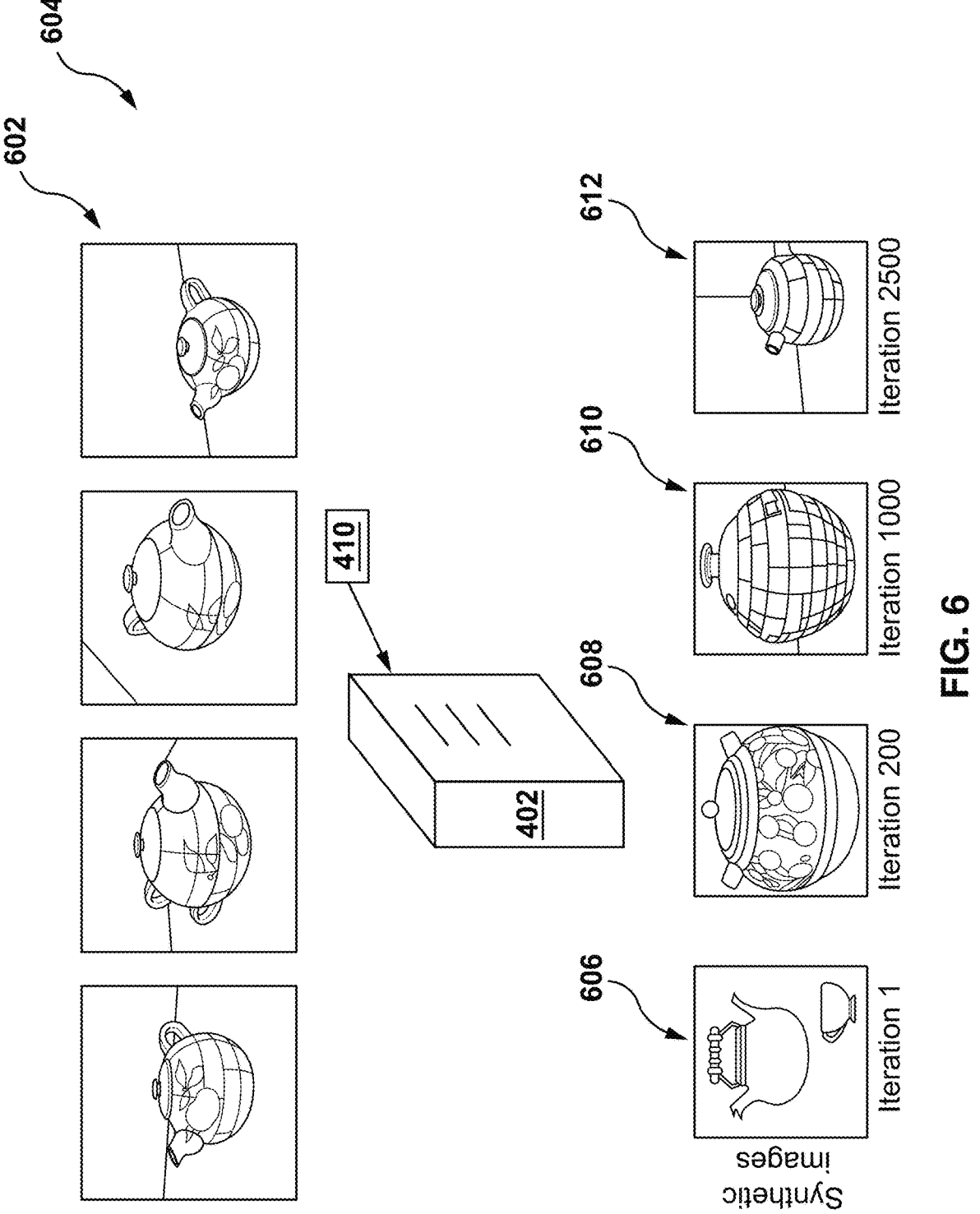
FIG. 6 depicts a schematic diagram of the adaptation process of the GMLM, executed by the server present in the networked computing environment of FIG. 2, in accordance with certain non-limiting embodiments of the present technology.

For example, as schematically depicted in FIG. 6, illustrating of the adaptation process of the GMLM 410, in accordance with certain non-limiting embodiments of the present technology, the plurality of adapting images 602 could include images representative of a teapot of a desired design selected by the user 406. Also, the user 406 could provide the textual description 604 of the object reading "Teapot". Thus, based on these input data, the server 402 could be configured to adapt the GMLM 410 to the plurality of adapting images 602, that is, train the GMLM 410 such that, in response to the textual description 604, the GMLM 410 would generate synthetic images that correspond to a concept provided by the user 406 in the plurality of adapting images 602.

It should be noted that the plurality of adapting images 602 including only four adapting images is provided as an example only for clarity and simplicity of the present description; and in no way as a limitation. In various non-limiting embodiments of the present technology, the plurality of adapting images 602 can include a larger number of adapting images, such as hundreds, thousands, or tens or even hundreds of thousands of adapting images. Also, as it can be appreciated from Equation (3), instead of being associated with a single textual description of the depicted object, that is, the textual description 604, the plurality of adapting images 602 can be associated with a plurality of different textual descriptions of the depicted object. For example, the plurality of textual description for the plurality of adapting images 602 illustrated in FIG. 6 can include, without limitation, "Teapot," "Teapot colorful pattern," "Teapot geometrical pattern," "Teapot suprematism," "Teapot Malevich-style design," and others. In these embodiments, to generate the given training digital object, the server 402 could be configured to sample (such as randomly) the respective textual description for the given adapting image.

Furthermore, the plurality of adapting images 602 can include images representative of various objects and concepts thereof and respective textual descriptions. In other words, the plurality of adapting images 602 can include sets of images and associated respective textual descriptions of respective objects of a plurality of objects.

As it can be appreciated, the longer the adaptation process of the GMLM 410 lasts, the closer the generated synthetic images would correspond to the concept, that is, in the current example, to the desired design of the teapot depicted in the plurality of adapting images 602. More specifically, after a first adapting iteration, a first synthetic image 606 was considerably visually distinct from the user-provided concept. Further, after a two-hundredth adapting iteration, a second synthetic image 608 may seem closer to the provided concept as it is at least in color and has a pattern. Further, after a thousandth adapting iteration, a third synthetic image 610 includes both a similar color scheme and a similar pattern of the teapot depicted in the plurality of adapting images 602. Further, after a two-thousand and five-hundredth iteration, a fourth synthetic image 612 is even closer to the user-provided concept than the third synthetic image 610. It should be expressly understood that the plurality of adapting iterations can include more or fewer adapting iterations than 2 500 as depicted in FIG. 6, such as 1 500, 10 000, 60 000, and the like.

However, the longer the adaptation process of the GMLM 410 lasts, the more computational resources of the server 402 it requires.

For example, the Textual Inversion algorithm, as described in Gal et al. mentioned above, is one of the most common algorithms for adaptation of the given text-to-image model that updates only the token embedding for $\hat{v}$. While this method is parameter-efficient, for reaching an acceptable inversion quality, it includes executing not less than 6000 training iterations, which equals 2 GPU hours on most computer systems.

While the Textual Inversion algorithm only learns the embedding of the target token, the DreamBooth algorithm, mentioned further above, is configured to execute a similar algorithm with a fully unfrozen U-Net component, whereas the Custom Diffusion algorithm is configured to update projection matrices of cross-attention layers that correspond to keys and values. These algorithms use a significantly smaller number of iterations, around 1000 and 500, respectively. However, as these algorithms are directed to learn more parameters via the adaptation of the given text-to-image model, the execution of these algorithms may require more computational resources of the server 402.

Thus, there is a need in the art for an informative metric representative of when the adaptation process of the GMLM 410 should be terminated without compromising the quality of the generated synthetic images. In other words, certain non-limiting embodiments of the present technology are directed to a method and system for determining a moment when further executing the adaptation process results in a significantly lower gain in the quality of the generated synthetic images, which is not worth using the computational resources of the server 402.

By assessing the quality of adaptation of the GMLM 410 to the plurality of adapting images 602 using the CLIP image similarity score, as described in the paper by Voronov et al., the developers could demonstrate that the CLIP image similarity score showed significant improvement at the beginning of the adaptation process and did not significantly increase afterwards.

Further, the developers have appreciated that values the loss functions, as defined, for example, in Equation (3), can be used for defining the metric for the earlier termination of the adaptation process. However, as mentioned above with reference to FIGS. 1 and 2, in its original form, this loss function is very noisy and does not show any sign of conversion, which affects the informativeness of such a loss function.

Thus, the developers of the present technology have identified parameters of the loss function of Equation (3) that contribute to the output noise thereof and realized that if for certain (reference) training digital objects these parameters had fixed values, that is, would not change during the adaptation process of the GMLM 410, the loss function of Equation (3) on these reference training digital objects will converge during the adaptation process. Therefore, values of the loss function of Equation (3) having determined using the reference training digital objects, may enable to define a convergence metric, in response to a certain value of which the adaptation process of the GMLM 410 can be terminated without significant loss in the quality of the generated synthetic images. These values of the loss function of Equation (3) hence define a so-called "deterministic loss function."

How the server 402 can be configured to generate the reference training digital objects and define the convergence metric, in accordance with certain non-limiting embodiments of the present technology, will now be described.

Communication Network

In some non-limiting embodiments of the present technology, the communication network 408 is the Internet. In alternative non-limiting embodiments of the present technology, the communication network 408 can be implemented as any suitable local area network (LAN), wide area network (WAN), a private communication network or the like. It should be expressly understood that implementations for the communication network are for illustration purposes only. How a respective communication link (not separately numbered) between each one of the server 402, the electronic device 404, and the communication network 408 is implemented will depend, inter alia, on how each one of each one of the server 402 and the electronic device 404 is implemented. Merely as an example and not as a limitation, in those embodiments of the present technology where the electronic device 404 includes a wireless communication device, the communication link can be implemented as a wireless communication link. Examples of wireless communication links include, but are not limited to, a 3G communication network link, a 4G communication network link, and the like. The communication network 408 may also use a wireless connection with the server 402.

Deterministic Loss Function

As alluded to above, according to certain non-limiting embodiments of the present technology, to generate the deterministic loss function, prior to executing the adaptation process of the GMLM 410 as described above, the server 402 can be configured to: (i) sample, from the plurality of training digital objects, generated based on the plurality of adapting images 602, for adapting the GMLM 410 to the plurality of adapting images 602, at least one reference training digital object; and (ii) identify and fix sources of noise in the at least one reference training digital object for the duration of the adaptation process of the GMLM 410.

Further, during the adaptation process, the server 402 can be configured to use a given reference training digital object from the at least one reference training digital object for validating the quality of the adaptation of the GMLM 410.

It is not limited how the server 402 can be configured to sample the at least one reference training digital object. For example, in some non-limiting embodiments of the present technology, the server 402 can be configured to sample the at least one reference training digital object from the plurality of training digital objects randomly. In other non-limiting embodiments of the present technology, the server 402 can be configured to sample each one of the at least one reference training digital object from the plurality of training digital objects uniformly. Other approaches of sampling the at least one reference training digital object are also envisioned. Also, it should be expressly understood that the at least one reference training digital object can include any number of training digital objects fewer than the remaining training digital objects in the plurality of training digital objects, such as one, eight, twenty, or sixty-five, as an example. As will become apparent from the description provided hereinbelow, in some non-limiting embodiments of the present technology, the number of reference training digital objects to be sampled can be predetermined based on a trade-off between an amount of output noise of the loss function expressed in Equation (3) on these reference training digital objects and how close values of the loss function on these reference training digital object correspond to other image quality assessment metrics of the adaption of the GMLM 410, such as the CLIP image similarity score, as an example.

Once the server 402 has sampled the at least one reference training object, in some non-limiting embodiments of the present technology, the server 402 can be configured to exclude the at least one reference from the plurality of training digital objects, thereby generating an adaptation plurality of training digital objects. Thus, during the adaptation process of the GMLM 410, the server 402 is configured to use the adaptation plurality of training digital objects for actually adapting the GMLM 410 to the plurality of adapting images 602 and use the at least one reference training objects, the sources of noise of which are fixed, to assess a current quality of the adaptation of the GMLM 410 and determine when the adaptation process should be terminated.

Figure 2:
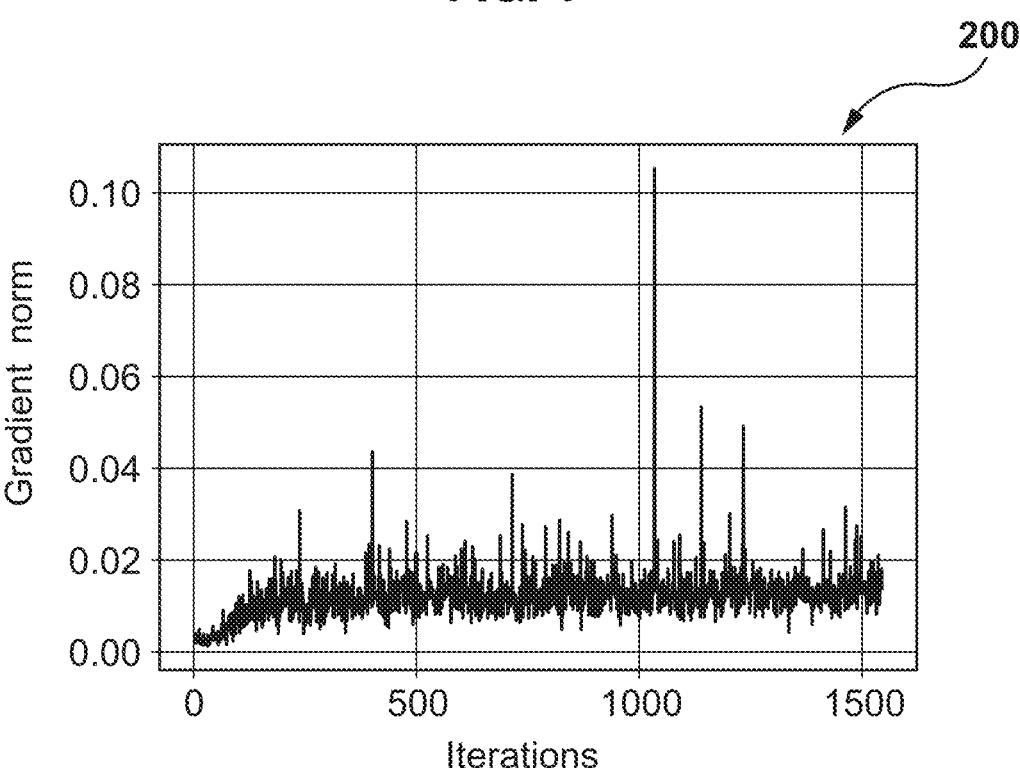
FIG. 2 schematically depicts a graph showing dependency between values of a gradient norm and the number of iterations of the adaptation process of the GMLM, in accordance with certain non-limiting embodiments of the present technology.

Further, according to certain non-limiting embodiments of the present technology, components of the given reference training digital object that may contribute to the noise of the loss function defined by Equation (3), which is schematically depicted in the first graph 100 of FIG. 1, include:

$\varepsilon(x)$, the respective noisy image vector of the given adapting image x of the plurality of adapting images 602;

$\epsilon$, the respective level of the diffusion noise applied to the given adapting image x;

$c(y)$, the respective text vector for the textual description 604 y of the given object depicted in the given adapting image x; and t, the respective number of diffusion steps over which the respective noisy image vector of the given adapting image x has been generated.

Thus, for the given reference training digital object, the server 402 can be configured to retain at least some of the above components unchanged during the whole duration of the adaptation process of the GMLM 410. For example, in some non-limiting embodiments of the present technology, the server 402 can be configured to retain all of the above components of the given reference training digital unchanged during the adaptation process.

In other non-limiting embodiments of the present technology, the server 402 can be configured to retain only some of the above components of the given reference training digital object unchanged while re-determining others at each new validation step. For example, in some non-limiting embodiments of the present technology, at each validation step, the server 402 can be configured to re-determine (1) the respective noisy image vector and (2) the respective text vector for the respective textual description y associated with the given adapting image x, while retaining the other components of the given reference training digital object unchanged. In these embodiments, the server 402 can be configured to re-apply the encoder and the text encoder mentioned above to the given adapting image and the respective textual description, respectively. However, in other non-limiting embodiments of the present technology, to re-determine the respective text vector for the respective textual description associated with the given adapting image x, the server 402 can be configured to re-sample the respective textual description for the given adapting image x.

In another example, at each validation step, the server 402 can be configured to (1) use a different adapting image of the given object for the given reference training digital object and (2) apply a different level of the diffusion noise to generate the associated noisy image vector while retaining the other components of the given reference training digital object unchanged.

According to certain non-limiting embodiments of the present technology, the server 402 can be configured to execute the validation step in cycles. A given cycle can include a predetermined number of adapting iterations, such as 10, 20, or 50, as an example. In some non-limiting embodiments of the present technology, the given cycle can include only one adapting iterations, in which case the server 402 is configured to execute the validation step at each adapting iteration.

Figure 7:
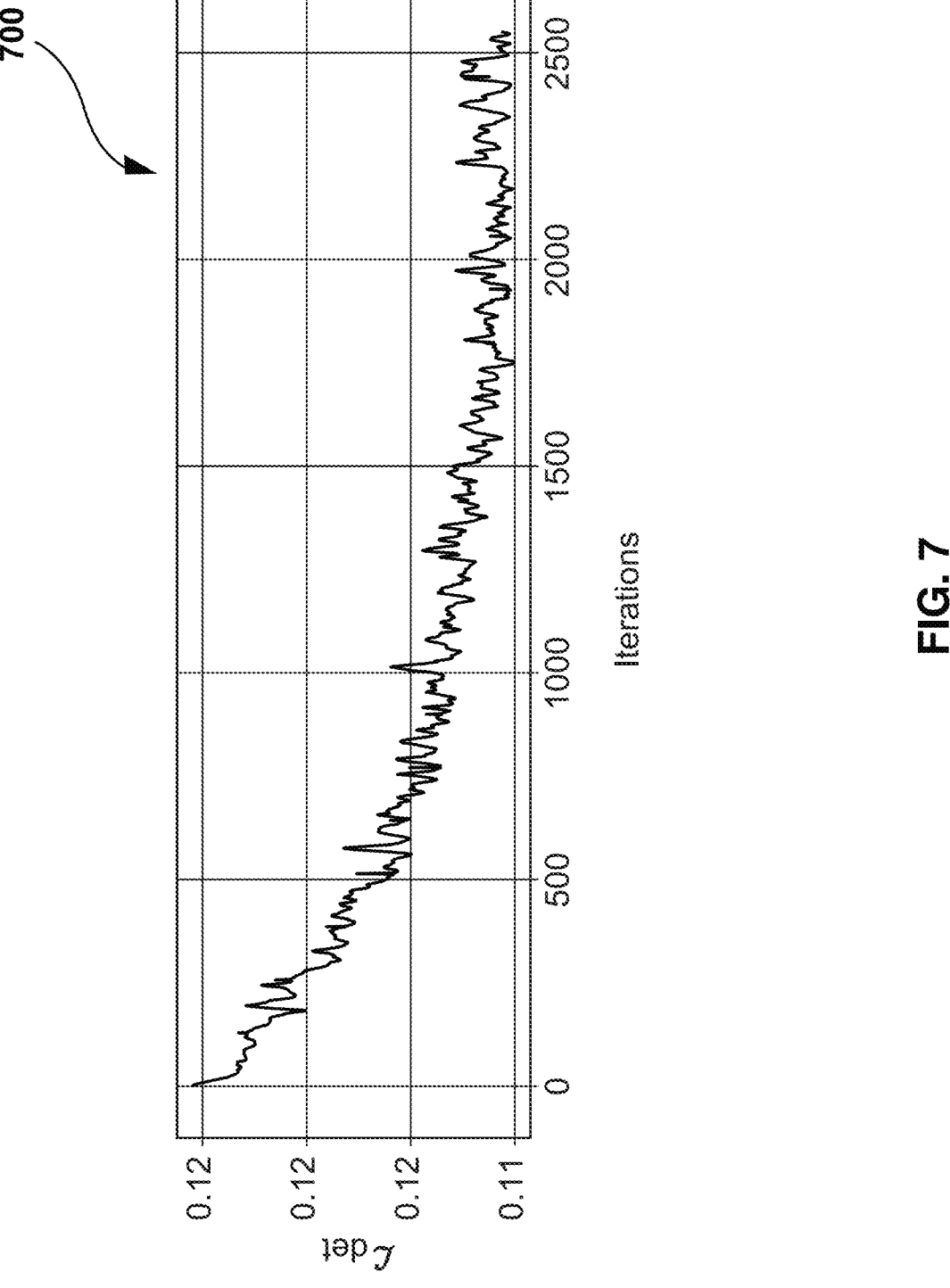
FIG. 7 schematically depicts a graph showing dependency between values of a deterministic loss function, generated, by the server present in the networked computing environment of FIG. 2, during the adaptation process of the GMLM using reference training digital objects, in accordance with certain non-limiting embodiments of the present technology.

Thus, during the adaptation process of the GMLM 410, after each predetermined number of adapting iterations, the server 402 can be configured to execute the validation step by: (i) feeding, to the GMLM 410, the given refence training digital object, thereby causing the GMLM 410 to generate a respective reference prediction of the applied level of the diffusion noise; and (ii) determining a respective reference value of the loss function expressed by Equation (3). Thus, respective reference values of the loss function expressed by Equation (3), determined, by the server 402 at each cycle during the adaptation process, define the deterministic loss function, a third graph 700 of which is schematically depicted in FIG. 7, in accordance with certain non-limiting embodiments of the present technology.

As it can be appreciated from the third graph 700, unlike the conventional loss function, the first graph 100 of which is depicted in FIG. 1, the deterministic loss function converges to a minimum, which enables determining the convergence metric for the adaptation process of the GMLM 410, which will be described immediately below.

Convergence Metric

According to certain non-limiting embodiments of the present technology, the server 402 can be configured to define the convergence metric for the adaptation process of the GMLM 410 by analyzing the values of the deterministic loss function, that is, the respective reference values of the loss function defined by Equation (3) determined using the given reference training digital object during each validation step.

Further, the sever 402 can be configured to use the convergence metric defined in accordance with various non-limiting embodiments of the present technology described below, the server 402 can be configured to determine an early stopping criterion for the adaptation process of the GMLM 410. In other words, the server 402 can be configured to determine a value of the convergence metric after each validation step; and in response to a current value of the convergence metric, at a current cycle of executing the validation step, being lower than a predetermined convergence threshold, the server 402 can be configured to terminate further adaptation of the GMLM 410.

In some non-limiting embodiments of the present technology, the convergence metric can be based on a variance of the values of the deterministic loss function. More specifically, in these embodiments, the convergence metric can be representative of a ratio between (i) a local variance of values of the deterministic loss function over a first number of cycles of executing the validation step; and (ii) a global variance of values of the deterministic loss function over a second number of cycles of executing the validation step, the second number of cycles being greater than the first number of cycles. In these embodiments, the convergence metric is referred to as a "Deterministic Variance Evaluation (DVAR)" metric.

A pseudocode in NumPy/PyTorch for determining the DVAR metric in these embodiments can have a following look:

```
def    DVAR(losses,    window_size,    threshold):
    running_var=losses[−window_size:].var(          )
    total_var=losses.var( )
ratio=running_var/total_var return ratio<threshold
```

As described in detail in the aforementioned paper by Voronov et al., in their experiments, the developers have determined that if the server 402 is configured to adapt the GMLM 410 to the plurality of adapting images 602 using the Text Inversion algorithm, the first number of cycles can be 310 (three hundred and ten) and the predetermined convergence threshold value can be 0.15. In another example, where the server 402 is configured to adapt the GMLM 410 using the DreamBooth algorithm, the first number of cycles can be selected to be 440 (four hundred and forty), and the predetermined convergence threshold value can be 0.4. In yet other example, where the server 402 is configured to adapt the GMLM 410 using the Custom Diffusion algorithm, the first number of cycles can be selected to be 180 (one hundred and eighty), and the predetermined convergence threshold value can be 0.15.

It should be expressly understood that these values for the first number of cycles and the predetermined convergence threshold value are provided only as examples; and other values for these parameters for using the DVAR metric with each of the above-mentioned adapting algorithms are envisioned without departing from the scope of the present technology. More specifically, particular values for these parameters can be selected based on a trade-off between a desired quality of the generated synthetic images of the GMLM 410 and the amount of available computational resources. Also, in some non-limiting embodiments of the present technology, the second number of cycles can be determined based on how closely the DVAR metric is aligned with other metrics, such as the CLIP image similarity metric.

However, in other non-limiting embodiment of the present technology, the server 402 can be configured to define the convergence differently. For example, in some non-limiting embodiments of the present technology, the convergence metric can comprise a ratio between: (i) a current exponential moving average (EMA) of values of the deterministic loss function at the given cycle; and (ii) a past EMA, determined over a predetermined number of past cycles. In other words, the convergence metric can be expressed by a following equation:

$$M_{EMA} = \frac{EMA(t) - EMA(t-n)}{EMA(t-n)}, \tag{4}$$

where EMA(t) is the current EMA at the given cycle;
    EMA(t−n) is the past EMA; and
    n is the predetermined number of cycles.

In yet other non-limiting embodiments of the present technology, the convergence metric can include a Hall criterion that is representative of a ratio between: (i) a difference between a maximum value and minimum value of the deterministic loss function over a given number of cycles; and (ii) a mean value of the deterministic loss function over the given number of cycles. In other words, in these embodiments, the server 402 can be configured to define the convergence metric so that it is expressed by a following equation:

$$M_{Hall} = \frac{\max(\mathcal{L}_{det}^n) - \min(\mathcal{L}_{det}^n)}{\text{mean}(\mathcal{L}_{det}^n)}, \tag{5}$$

where $\mathcal{L}_{det}^n$ is a given value of the deterministic loss function over a given number of cycles n.

In yet other non-limiting embodiments of the present technology, the server 402 can be configured to define the convergence metric as a Trend metric that is representative of a slope of a graph of a linear regression that has been trained to predict values of the deterministic loss function based on past values thereof.

Thus, during the execution of the adaptation process, according to certain non-limiting embodiments of the present technology, the server 402 can be configured to: (i) at a given adapting iteration of the plurality of adapting iterations, feed, to the GMLM 410, a given training digital object from the adaptation plurality of training digital objects, thereby causing the GMLM 410 to generate a respective intermediate prediction; and (ii) minimize the difference between the respective intermediate synthetic image and the respective adapting image of the given training digital object by minimizing the value of the loss function defined by Equation (3). At the same time, in each cycle including the predetermined number of adapting iterations (such as 50, for example), the server 402 can be configured to execute the validation step, including: (i) feeding, to the GMLM 410, the given reference training digital object (which never changes during the adaptation process), thereby causing the GMLM 410 to generate the respective intermediate prediction; (ii) determining, based on the given reference training digital object and the respective intermediate prediction responsive thereto, the respective reference value of the loss function according to Equation (3) (hence defining the respective value of the deterministic loss function); (iii) determining the current value of the convergence metric; and (iv) in response to the current value of the convergence metric being lower than the predetermined convergence threshold value, terminating the adaptation process of the GMLM 410 without executing any further adapting iterations.

As demonstrated in the aforementioned paper by Voronov et al., using the convergence metric described herein as the early stopping criterion for the adaptation process of the GMLM 410 may allow reducing the number of adapting iterations to be executed for adapting the GMLM 410 by up to two thirds without considerably compromising the quality of the synthetic images, generated in accordance with the provided concept in the plurality of adapting images 602. By doing so, the present methods and systems may allow reducing the consumption of computational resources of the server 402 for executing the adaptation process of the GMLM 410.

Computer-Implemented Method

Given the architecture and the examples provided hereinabove, it is possible to execute a method of personalizing a GMLM, such as the GMLM 410, to a given plurality of user-provided images, such as the plurality of adapting images 602 provided by the user 406. With reference to FIG. 8, there is depicted a flowchart of a first method 800, according to the non-limiting embodiments of the present technology. The method 800 can be executed by the server 402 including the computer system 300.

Step 802: Receiving the Given Plurality of Images, a Given Image of the Given Plurality of Images being Representative of a Given Object; Receiving a Respective Textual Description for the Given Object Depicted in the Given Image The method 800 commences at step 802 with the server 402 being configured to receive, from the electronic device 404 of the user 406, input data for adapting the GMLM 410 that has been pre-trained to generate images of objects in accordance with respective textual descriptions thereof as described with reference to FIGS. 4 and 5. According to certain non-limiting embodiments of the present technology, the input data can include: (i) the plurality of adapting images 602 representative of the given object, images of which the GMLM 410 has been pre-trained to generate; and (ii) the textual description 604 of the given object depicted in each one of the plurality of adapting images 602.

In some non-limiting embodiments of the present technology, the GMLM 410 is a diffusion MLM. In some non-limiting embodiments of the present technology, the diffusion MLM is a Stable diffusion MLM.

The method 800 hence advances to step 804.

Step 804: Applying, to the Given Image, an Image Encoding Algorithm, Thereby Generating a Respective Image Vector for the Given Image; Applying, to the Respective Textual Description Associated with the Given Image, a Text Encoding Algorithm, Thereby Generating a Respective Text Vector for the Respective Textual Description; Applying, to the Respective Image Vector, During a Respective Number of Diffusion Steps, a Respective Level of a Diffusion Noise, Thereby Generating a Respective Noisy Image Vector for the Given Image At step 804, according to certain non-limiting embodiments of the present technology, the server 402 can be configured to convert the input data into respective formats receivable by the GMLM 410.

More specifically, at step 604, the server 402 can be configured to: (i) using the encoder of the GMLM 410, generate, for the given adapting image of the plurality of adapting images 602, the respective image vector; (ii) using the text encoder of the GMLM 410, generate the respective text vector for the textual description 604 of the given object; and (iii) using the diffusion algorithm of the GMLM 410, apply to the respective image vector, over the respective number of diffusion steps, the respective level of the diffusion noise, thereby generating the respective noisy image vector for the given adapting image.

The method 800 hence advances to step 806.

Step 806: Compiling a Training Set of Data Including a Plurality of Training Digital Objects, a Given One of which Includes: (I) a Set of Images Representative of the Given Object and Respective Noisy Image Vectors Associated Therewith; (II) a Respective Set of Textual Descriptions of the Given Object and Respective Text Vectors Associated Therewith At step 806, according to certain non-limiting embodiments of the present technology, the server 402 can be configured to compile the adapting training set of data, which includes the plurality of training digital objects, the given training digital object of which includes: (i) the given adapting image of the plurality of adapting images 602 and the respective noisy image vector; and (ii) the textual description 604 of the given object in the given adapting image and the respective text vector.

In those embodiments where the plurality of adapting images 602 is associated with the plurality of textual descriptions as mentioned above, for generating the given training digital object, the server 402 can be configured to sample the respective textual description, including the respective text vector, for the given adapting image.

The method 800 hence advances to step 808.

Step 808: Sampling, from the Plurality of Training Digital Objects, at Least One Reference Training Digital Object for Using During a Validation Step; Excluding the at Least One Reference Training Digital Object from the Plurality of Training Digital Objects, Thereby Generating an Adaptation Plurality of Training Digital Objects At step 808, according to certain non-limiting embodiments of the present technology, the server 402 can be configured to sample, from the plurality of training digital objects, at least one reference training digital objects, as mentioned above, for further use to execute the validation steps during the adaptation process.

Further, once the server 402 has sampled the at least one reference training object, in some non-limiting embodiments of the present technology, the server 402 can be configured to exclude the at least one reference from the plurality of training digital objects, thereby generating the adaptation plurality of training digital objects. Thus, during the adaptation process of the GMLM 410, the server 402 is configured to use the adaptation plurality of training digital objects for actually adapting the GMLM 410 to the plurality of adapting images 602 and use the at least one reference training objects, the sources of noise of which are fixed, to assess a current quality of the adaptation of the GMLM 410 and determine when the adaptation process should be terminated.

The method 800 thus proceeds to step 810.

Step 810: Feeding, at Each Training Iteration, to the Diffusion Model, a Respective Training Digital Object of the Adaptation Plurality of Training Digital Objects, Thereby Causing the Diffusion Model to Generate, from the Respective Noisy Image Vector, a Synthetic Image Representative of a Respective Object At step 810, according to certain non-limiting embodiments of the present technology, during the given adapting iteration of the plurality of adapting operations, the server 402 can be configured to feed, to the GMLM 410, the given training digital object from the adaptation plurality of training digital objects. By doing so, the server 402 is configured to cause the GMLM 410 to generate the respective intermediate prediction, comprising a respective predicted level of the diffusion noise applied to the given adapting image in the given training digital object. Further, the server 402 can be configured to minimize the difference between the respective intermediate synthetic image and the respective adapting image of the given training digital object by minimizing the value of the loss function defined by Equation (3). By doing so, the server 402 can be configured to update node weights of the GMLM 402, thereby adapting the GMLM 402 to the plurality of adapting images 602.

The method 800 hence advances to step 812.

Step 812: In Each Cycle Having a Predetermined Number of Training Iterations, Executing the Validation Step by Feeding a Respective Reference Training Digital Object from the at Least One Reference Training Digital Object to the Diffusion Model, Thereby Causing the Diffusion Model to Generate a Respective Synthetic Reference Image, Wherein the at Least One Reference Training Digital Object does not Change Between Cycles; Determining, for a Given Cycle, a Value of a Loss Function Indicative of a Difference Between the Given Image of the Respective Reference Training Digital Object and the Respective Synthetic Reference Image at the Given Cycle While adapting the GMLM 410 to the plurality of adapting images 602 using the adaptation plurality of training digital objects, at step 812, according to certain non-limiting embodiments of the present technology, in each cycle including the predetermined number of adapting iterations (such as 50, for example), the server 402 can be configured to execute the validation step, including: (i) feeding, to the GMLM 410, the given reference training digital object, thereby causing the GMLM 410 to generate the respective intermediate prediction, the given reference training digital object never changing during the adaptation process; (ii) determining, based on the given reference training digital object and the respective intermediate prediction responsive thereto, the respective reference value of the loss function according to Equation (3).

The method 800 hence advances to step 814.

Step 814: In Response to a Convergence Metric Associated with the Loss Function being Below a Predetermined Convergence Threshold at the Given Cycle, Terminating the Personalizing the Diffusion Model without Using any Further Training Digital Objects At step 814, according to non-limiting embodiments of the present technology, the server 402 can be configured to (i) determine the current value of the convergence metric; and (ii) in response to the current value of the convergence metric being lower than the predetermined convergence threshold value, terminating the adaptation process of the GMLM 410 without executing any further adapting iterations.

In some non-limiting embodiments of the present technology, the convergence metric can be the DVAR metric defined above. However, in other non-limiting embodiments of the present technology, the convergence metric can be defined differently—such as that defined by one of Equations (4) and (5).

The method 800 thus terminates.

Thus, certain non-limiting embodiments of method 800 may allow defining the early-stopping criterion for the adaptation process of the GMLM 402 without significantly affecting the quality of generated synthetic images. This may allow saving computational resources of the server 402 on adapting the GMLM 410 to the plurality of adapting images 602.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for adapting a diffusion model, which has been pre-trained to generate images of objects based on textual descriptions thereof, to a given plurality of images of at least one object that the diffusion model has been pre-trained to generate, the method comprising:

receiving the given plurality of images, a given image of the given plurality of images being representative of a given object;

receiving a respective textual description for the given object depicted in the given image;

applying, to the given image, an image encoding algorithm, thereby generating a respective image vector for the given image;

applying, to the respective textual description associated with the given image, a text encoding algorithm, thereby generating a respective text vector for the respective textual description;

applying, to the respective image vector, during a respective number of diffusion steps, a respective level of a diffusion noise, thereby generating a respective noisy image vector for the given image;

compiling a training set of data including a plurality of training digital objects, a given one of which includes:
(i) a set of images representative of the given object and respective noisy image vectors associated therewith;
(ii) a respective set of textual descriptions of the given object and respective text vectors associated therewith;

sampling, from the plurality of training digital objects, at least one reference training digital object for using during a validation step;

excluding the at least one reference training digital object from the plurality of training digital objects, thereby generating an adaptation plurality of training digital objects;

feeding, at each training iteration, to the diffusion model, a respective training digital object of the adaptation plurality of training digital objects, thereby causing the diffusion model to generate, from the respective noisy image vector, a synthetic image representative of a respective object;

in each cycle having a predetermined number of training iterations, executing the validation step by feeding a respective reference training digital object from the at least one reference training digital object to the diffusion model, thereby causing the diffusion model to generate a respective synthetic reference image, wherein the at least one reference training digital object does not change between cycles;

determining, for a given cycle, a value of a loss function indicative of a difference between the given image of the respective reference training digital object and the respective synthetic reference image at the given cycle; and in response to a convergence metric associated with the loss function being below a predetermined convergence threshold at the given cycle, terminating the adapting the diffusion model without using any further training digital objects.

2. The method of claim 1, wherein the text encoding algorithm comprises a Transformer-based machine-learning algorithm (MLA) that has been trained to generate text embeddings from input text.

3. The method of claim 1, wherein the loss function is expressed by a following equation:

$$\mathcal{L}_{det} = \|\epsilon - \epsilon_\theta(z_t(\varepsilon(x), \epsilon), c(y), t)\|_2^2,$$

where $\epsilon_\theta$ is the respective synthetic reference image generated at the given cycle in response to feeding, to the diffusion model, the given image x of the respective reference training digital object;

$\varepsilon(x)$ is the respective noisy image vector of the given image x;

$\epsilon$ is the respective level of the diffusion noise applied to the given image x;

c(y) is the respective text vector for the respective textual description y of the given object depicted in the given image x; and t is the respective number of diffusion steps over which the respective noisy image vector of the given image x has been generated.

4. The method of claim 3, wherein each one of (i) the respective noisy image vector of the given image; (ii) the respective level of the diffusion noise; (iii) the respective textual description for the given object depicted in the given image; and (iv) the respective number of diffusion steps does not change between cycles.

5. The method of claim 3, wherein at least one of (i) the respective noisy image vector of the given image; (ii) the respective level of the diffusion noise; (iii) the respective textual description for the given object depicted in the given image; and (iv) the respective number of diffusion steps does not change between cycles while other ones of (i) the respective noisy image vector of the given image; (ii) the respective level of the diffusion noise; (iii) the respective textual description for the given object depicted in the given image; and (iv) the respective number of diffusion steps are re-determined at each cycle.

6. The method of claim 1, wherein the set of images of the respective reference training digital object includes a predetermined number of images of the respective object.

7. The method of claim 1, wherein the convergence metric is representative of a ratio between: (i) a local variance of values of the loss function over a first number of cycles; and (ii) a global variance of values of the loss function over a second number of cycles, the second number of cycles being greater than the first number of cycles.

8. The method of claim 1, wherein the convergence metric is representative of a ratio between: (i) a current exponential moving average (EMA) of values of the loss function at the given cycle; and (ii) a past EMA, determined over a predetermined number of past cycles.

9. The method of claim 8, wherein the convergence metric is expressed by a following equation:

$$\mathcal{M}_{EMA} = \frac{EMA(t) - EMA(t-n)}{EMA(t-n)},$$

where EMA(t) is the current EMA at the given cycle;

EMA(t–n) is the past EMA;

t is an index representing the given cycle; and n is the predetermined number of cycles.

10. The method of claim 1, wherein the convergence metric comprises a Hall criterion that is representative of a ratio between: (i) a difference between a maximum value and minimum value of the loss function over a given number of cycles; and (ii) a mean value of the loss function over the given number of cycles.

11. The method of claim 10, wherein the convergence metric is expressed by a following equation:

$$\mathcal{M}_{Hall} = \frac{\max(\mathcal{L}_{det}^n) - \min(\mathcal{L}_{det}^n)}{\text{mean}(\mathcal{L}_{det}^n)}.$$

where $\mathcal{L}_{det}^n$ is a given value of the loss function over the given number of cycles n.

12. The method of claim 1, wherein the convergence metric is a Trend metric that is representative of a slope of a graph of a linear regression that has been trained to predict values of the loss function based on past values thereof.

13. The method of claim 1, wherein the diffusion model is a Stable diffusion model.

14. A server for adapting a diffusion model, which has been pre-trained to generate images of objects based on textual descriptions thereof, to a given plurality of images of at least one object that the diffusion model has been pre-trained to generate, the server comprising at least one processor and at least one non-transitory computer-readable memory storing executable instructions, which, when executed by the at least one processor, cause the server to:

receive the given plurality of images, a given image of the given plurality of images being representative of a given object;

receive a respective textual description for the given object depicted in the given image;

apply, to the given image, an image encoding algorithm, thereby generating a respective image vector for the given image;

apply, to the respective textual description associated with the given image, a text encoding algorithm, thereby generating a respective text vector for the respective textual description;

apply, to the respective image vector, during a respective number of diffusion steps, a respective level of a diffusion noise, thereby generating a respective noisy image vector for the given image;

compile a training set of data including a plurality of training digital objects, a given one of which includes: (i) a set of images representative of the given object and respective noisy image vectors associated therewith; (ii) a respective set of textual descriptions of the given object and respective text vectors associated therewith;

sample, from the plurality of training digital objects, at least one reference training digital object for using during a validation step;

exclude the at least one reference training digital object from the plurality of training digital objects, thereby generating an adaptation plurality of training digital objects;

feed, at each training iteration, to the diffusion model, a respective training digital object of the adaptation plurality of training digital objects, thereby causing the diffusion model to generate, from the respective noisy image vector, a synthetic image representative of a respective object;

in each cycle having a predetermined number of training iterations, execute the validation step by feeding a respective reference training digital object from the at least one reference training digital object to the diffusion model, thereby causing the diffusion model to generate a respective synthetic reference image, wherein the at least one reference training digital object does not change between cycles;

determine, for a given cycle, a value of a loss function indicative of a difference between the given image of the respective reference training digital object and the respective synthetic reference image at the given cycle; and in response to a convergence metric associated with the loss function being below a predetermined convergence threshold at the given cycle, terminate the adapting the diffusion model without using any further training digital objects.

15. The server of claim 14, wherein the text encoding algorithm comprises a Transformer-based machine-learning algorithm (MLA) that has been trained to generate text embeddings from input text.

16. The server of claim 14, wherein the loss function is expressed by a following equation:

$$\mathcal{L}_{det} = \|\epsilon - \epsilon_\theta(z_t(\varepsilon(x), \epsilon), c(y), t)\|_2^2,$$

where $\epsilon_\theta$ is the respective synthetic reference image generated at the given cycle in response to feeding, to the diffusion model, the given image x of the respective reference training digital object;

$\varepsilon(x)$ is the respective noisy image vector of the given image x;

$\epsilon$ is the respective level of the diffusion noise applied to the given image x;

$c(y)$ is the respective text vector for the respective textual description y of the given object depicted in the given image x; and t is the respective number of diffusion steps over which the respective noisy image vector of the given image x has been generated.

17. The server of claim 16, wherein each one of (i) the respective noisy image vector of the given image; (ii) the respective level of the diffusion noise; (iii) the respective textual description for the given object depicted in the given image; and (iv) the respective number of diffusion steps does not change between cycles.

18. The server of claim 16, wherein at least one of (i) the respective noisy image vector of the given image; (ii) the respective level of the diffusion noise; (iii) the respective textual description for the given object depicted in the given image; and (iv) the respective number of diffusion steps does not change between cycles while other ones of (i) the respective noisy image vector of the given image; (ii) the respective level of the diffusion noise; (iii) the respective textual description for the given object depicted in the given image; and (iv) the respective number of diffusion steps are re-determined at each cycle.

19. The server of claim 14, wherein the set of images of the respective reference training digital object includes a predetermined number of images of the respective object.

20. The server of claim 14, wherein the convergence metric is representative of a ratio between: (i) a local variance of values of the loss function over a first number of cycles; and (ii) a global variance of values of the loss function over a second number of cycles, the second number of cycles being greater than the first number of cycles.

* * * * *